A. LYLES.
BUGGY WHEEL.
APPLICATION FILED MAY 21, 1913.

1,089,934.

Patented Mar. 10, 1914.
2 SHEETS—SHEET 2.

Inventor
Augustus Lyles
By Victor J. Evans
Attorney

Witnesses
M. F. Gannett
J. W. Garner

UNITED STATES PATENT OFFICE.

AUGUSTUS LYLES, OF WABBASEKA, ARKANSAS.

BUGGY-WHEEL.

1,089,934.

Specification of Letters Patent.  Patented Mar. 10, 1914.

Application filed May 21, 1913.  Serial No. 769,063.

*To all whom it may concern:*

Be it known that I, AUGUSTUS LYLES, a citizen of the United States, residing at Wabbaseka, in the county of Jefferson and State of Arkansas, have invented new and useful Improvements in Buggy-Wheels, of which the following is a specification.

This invention relates to improvements in vehicle wheels, for buggies, carriages, wagons and the like and consists in the construction, combination and arrangement of devices hereinafter described and claimed.

The object of my invention is to provide an improved vehicle wheel which is extremely strong and durable.

Another object is to effect improvements in the construction of the wheel hub so that the hub also acts as a brace to strengthen the spokes.

Another object is to provide braces for the outer ends of the spokes and means for adjusting the last-named braces to keep the parts of the wheel tight under all conditions.

Figure 1:
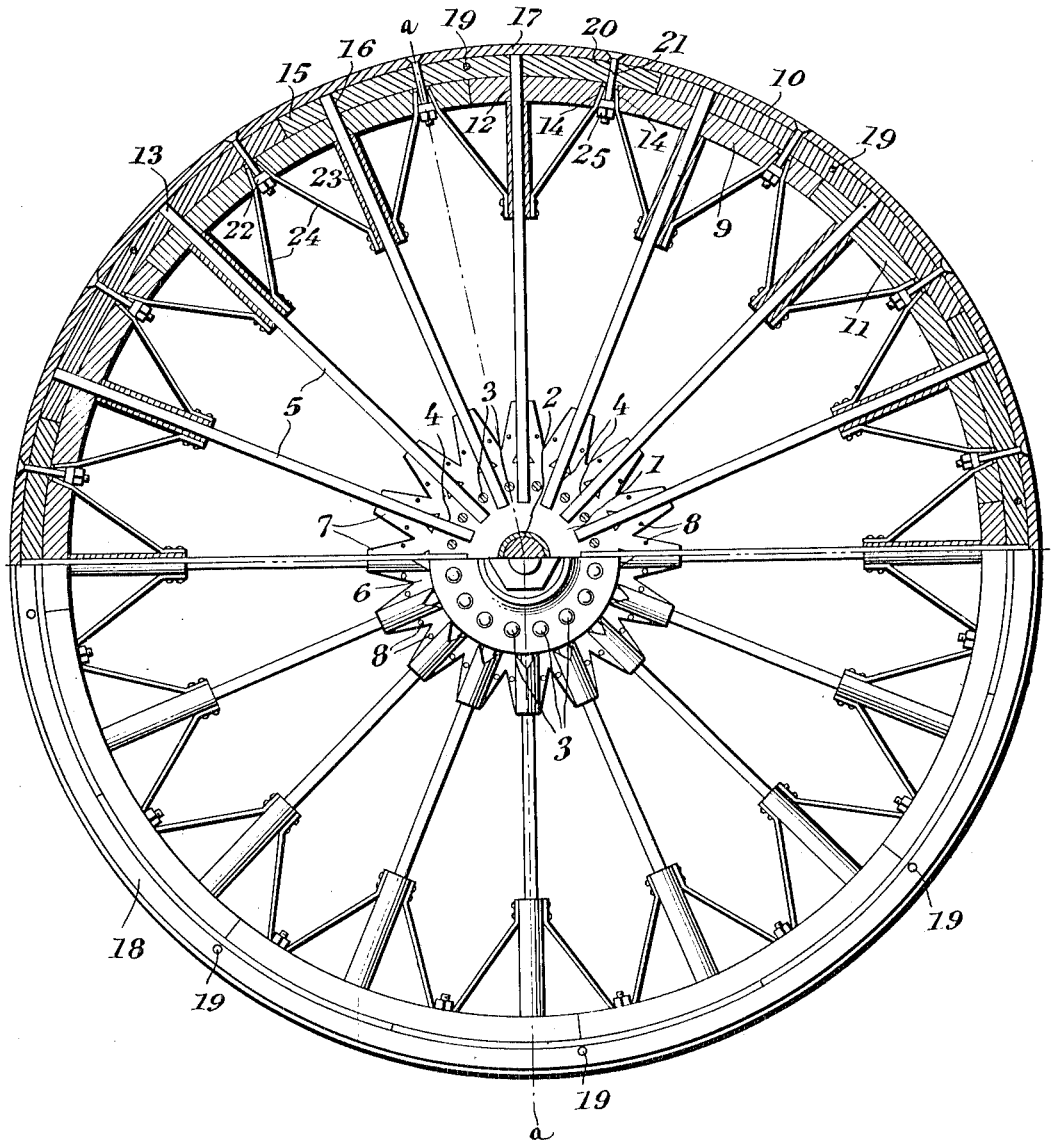
Figure 2:
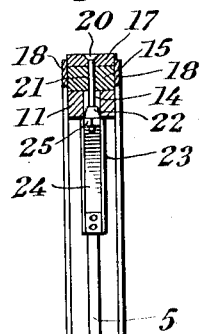
Figure 3:
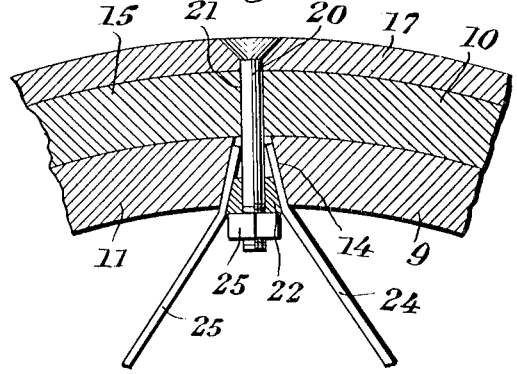
Figure 4:
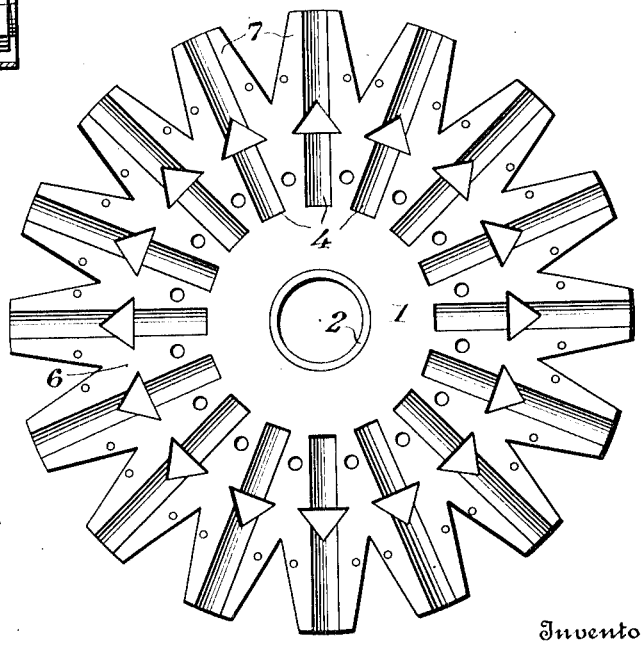

In the drawings:—Figure 1 is partly an elevation and partly a sectional view of a portion of a vehicle wheel constructed in accordance with my invention. Fig. 2 is a vertical transverse sectional view of the same on the plane indicated by the line *a—a* of Fig. 1. Figs. 3 and 4 are detail views.

In accordance with my invention, I provide a pair of hub plates 1 which have an opening 2 for the boxing of the wheel and to fit on the spindle of an axle. These hub plates are secured together by means of bolts or rivets 3 and the hub plates are provided on their opposing inner sides with radial grooves 4 which receive the inner ends of the spokes 5 so that the inner ends of the spokes are securely clamped between the hub plates. The hub plates are formed at their peripheries with crown pieces 6 which provide triangular braces 7, the bases of which are connected together and also to the hub plates and these crown pieces also are clamped on opposite sides of the spokes by means of suitable bolts or rivets 8. The spokes pass radially through the triangular braces, centrally thereof so that the apices of the triangular braces are coincident with the spokes, as shown. This construction of the hub and the combination of its parts with the spokes makes the central portion of the wheel exceedingly strong. I also provide an inner rim 9 and an outer rim 10.

The inner rim is preferably made of metal, iron or other suitable material, and is formed of detachable segments 11, the said segments having openings 12 for the reception of tenons 13 at the outer ends of the spokes and also having radial outwardly tapering openings 14 midway between the spokes. The outer rim 10 is preferably made of wood and of two or more segments 15 and has openings 16 for the reception of the outer portions of the spokes.

The tire 17 is mounted on the periphery of the outer rim and the latter is provided on opposite sides with securing rings 18, fastened by bolts or the like 19, and which bear on opposite sides of the tire and hold the same in place. Radially arranged bolts 20 have their heads countersunk in the tire and pass through radial openings 21 in the outer rim and also through the centers of the openings 14 of the inner rim. On the inner portions of these bolts are conical sleeves 22 the diameter of which is less than the enlarged ends of the openings 14.

Brace sleeves 23 are arranged on the outer portions of the spokes and bear against the inner side of the inner rim. Brace rods 24 are attached to these brace sleeves and the outer ends of the brace rods are passed through and arranged for adjustment in the openings 14 on opposite sides of the bolts 21 so that the outer ends of a pair of these brace rods are associated with each of the said bolts. The sleeves 22 bear between the said brace rods and when tightened on the bolts 21 by means of nuts 25, serve to adjust the brace rods radially of the wheel to put the brace sleeves under tension and to also firmly lock the outer ends of the brace rods in place in the openings 14, as will be understood. Hence, the spokes are greatly braced and strengthened at their outer ends and their connection with the inner rim of the wheel is greatly strengthened and is rendered adjustable so that the wheel can be kept tight at all times.

While I have herein shown and described a preferred form of my invention, I would have it understood that changes may be made in the form, proportion and construction of the several parts without departing from the spirit of my invention and within the scope of the appended claims.

I claim:—

1. A wheel having a rim provided with radial openings, spokes having their outer ends secured to the rim at points between said openings, brace sleeves on the spokes and bearing against the inner side of the rim, and brace rods having their inner ends attached to the brace sleeves and their outer ends adjustably secured in the radial openings of the rim.

2. A wheel having a rim provided with radial openings, spokes having their outer ends secured to the rim at points between said openings, brace sleeves on the spokes and bearing against the inner side of the rim, and brace rods having their outer ends arranged in pairs in opposite sides of the openings of the rim, the wheel being further provided with bolts extending through said openings and between the outer ends of the pairs of brace rods, adjusting and clamping sleeves on said bolts, bearing against the brace rods, and nuts on said bolts to adjust said sleeves and hold the latter and the brace rods in place.

3. A wheel having a rim provided with radial openings, spokes having their outer ends secured to the rim at points between said openings, brace sleeves on the spokes and bearing against the inner side of the rim, and brace rods having their outer ends arranged in pairs in opposite sides of the openings of the rim, the wheel being further provided with bolts extending through said openings and between the outer ends of the pairs of brace rods, adjusting and clamping sleeves on said bolts, bearing against the brace rods, and nuts on said bolts to adjust said sleeves and hold the latter and the brace rods in place, the wheel being further provided with an outer rim and with a tire, the said bolts also extending through said outer rim and tire and holding the same in place.

In testimony whereof I affix my signature in presence of two witnesses.

AUGUSTUS LYLES.

Witnesses:
JAMES MANUEL,
HENRY SHEPHERD.